United States Patent
Bitz et al.

(10) Patent No.: US 7,891,683 B2
(45) Date of Patent: Feb. 22, 2011

(54) TORSION-BEAM REAR AXLE OF A VEHICLE

(75) Inventors: Gerd Bitz, Mainz (DE); Jürgen Siebeneick, Oberwesel (DE); Eckhardt Döhrer, Flemlingen (DE)

(73) Assignee: GM Global Technology Operations LLC, Detroit, MI (US)

(*) Notice: Subject to any disclaimer, the term of this patent is extended or adjusted under 35 U.S.C. 154(b) by 178 days.

(21) Appl. No.: 12/207,336

(22) Filed: Sep. 9, 2008

(65) Prior Publication Data

US 2009/0066153 A1    Mar. 12, 2009

(30) Foreign Application Priority Data

Sep. 10, 2007    (DE) .................... 10 2007 043 121

(51) Int. Cl.
*B60G 21/055* (2006.01)
*B60G 3/14* (2006.01)

(52) U.S. Cl. .................. 280/124.128; 280/124.166; 280/124.108; 280/124.125

(58) Field of Classification Search .......... 280/124.128, 280/124.13, 124.116, 124.153, 124.108, 280/124.125, 124.166, 86.751, 86.758
See application file for complete search history.

(56) References Cited

U.S. PATENT DOCUMENTS

| | | | | |
|---|---|---|---|---|
| 4,930,805 | A * | 6/1990 | Takata et al. ........... | 280/124.128 |
| 6,173,977 | B1 * | 1/2001 | Fun ...................... | 280/124.116 |
| 7,128,327 | B2 * | 10/2006 | Kawamata et al. .... | 280/124.106 |
| 2006/0082094 | A1 * | 4/2006 | Mosler ................. | 280/124.116 |
| 2006/0138740 | A1 | 6/2006 | Nam | |
| 2007/0052192 | A1 * | 3/2007 | Kawanobe et al. ..... | 280/124.13 |

FOREIGN PATENT DOCUMENTS

| | | |
|---|---|---|
| DE | 3139792 A1 | 4/1983 |
| DE | 1982384 C1 | 11/1999 |
| DE | 10321877 A1 | 12/2004 |
| DE | 10321878 A1 | 12/2004 |
| DE | 10321879 A1 | 12/2004 |
| DE | 102004032081 A1 | 3/2005 |
| DE | 102004032808 A1 | 1/2006 |
| EP | 0681932 A2 | 11/1995 |

(Continued)

*Primary Examiner*—Ruth Ilan
(74) *Attorney, Agent, or Firm*—Ingrassia Fisher & Lorenz, P.C.

(57) ABSTRACT

A torsion-beam rear axle of a vehicle, more preferably motor vehicle, is provided with two rigid trailing arms, which with their one end are each mounted on a vehicle body in a manner capable of being swiveled and at the other end of which a wheel carrier is each attached for the rotatable mounting of a vehicle wheel about its wheel center axis, as well as with a torsionally soft cross-tie connecting the two trailing arms with each other. Each wheel carrier, by means of at least three elastic wheel carrier bearings is fixed to the trailing arm when viewed in forward driving direction of the vehicle, at least two wheel carrier bearings are arranged behind the wheel center axis, and at least one wheel carrier bearing is arranged in front of the wheel center axis in such a manner that through the two wheel carrier bearings arranged behind the wheel center axis to define a swivel axis for the swiveling of the wheel carrier relative to the trailing arm.

3 Claims, 1 Drawing Sheet

FOREIGN PATENT DOCUMENTS

| | | | |
|---|---|---|---|
| FR | 2700992 | A1 | 8/1994 |
| FR | 2701001 | A1 | 8/1994 |
| FR | 2726227 | A1 | 5/1996 |
| FR | 2879508 | A1 | 6/2006 |
| JP | 8067121 | A | 3/1996 |
| JP | 2002012015 | A | 1/2002 |
| WO | 9731794 | | 9/1997 |
| WO | 0074961 | A1 | 12/2000 |
| WO | 2008061973 | A1 | 5/2008 |

\* cited by examiner

TORSION-BEAM REAR AXLE OF A VEHICLE

CROSS-REFERENCE TO RELATED APPLICATION

This application claims priority to German Patent Application No. 102007043121.1, filed Sep. 10, 2007, which is incorporated herein by reference in its entirety.

TECHNICAL FIELD

The technical field relates to chassis technology and more particularly relates to a torsion-beam rear axle of a vehicle that is preferably a motor vehicle.

BACKGROUND

Torsion-beam rear axles as such are sufficiently well-known in the area of chassis technology. Torsion-beam rear axles, for example, are employed as a standard in modern motor vehicles, such as the Opel Corsa and Opel Astra. Generic torsion-beam rear axles are described, for example, in the European patent EP 0 681 932 B2 and German disclosure publication DE 10 2004 032 08 A1.

Such a torsion-beam rear axle comprises two rigid trailing arms which at their front end are each attached to the vehicle body or an axle support in a manner capable of being swiveled about a swivel axis arranged across the vehicle longitudinal direction and at the rear end are each provided with a wheel carrier for the rotatable mounting of a vehicle wheel each. In addition, the two trailing arms are connected with each other through a flexurally stiff cross-tie which is arranged in front of an imaginary connection line of the wheel center axes of the two vehicle wheels. The torsionally soft cross-tie ("torsion-beam") also acts as stabilizer as a result of which on driving through a curve when the curve inner wheel rebounds and the curve outer wheel compress the curve behavior of the vehicle can be considerably improved.

In addition to the vehicle weight, the torsion-beam rear axle must also absorb forces which act on the wheels during acceleration or deceleration of the vehicle. More preferably, when driving through a curve, lateral forces occur on the wheel contact lines of the wheels through which the trailing arms because of their design are swiveled about their front bearing points on the vehicle body. For this reason, torsion-beam rear axles tend towards an over steer movement when driving through curves ("later force over steer"), which in an undesirable manner can result in that the vehicle rear breaks out more easily when driving through curves.

In order to solve the problem of the lateral force over steer with torsion-beam rear axles, an active adjustment of the wheel carriers with the help of an actuator has already been considered. Such an active adjustment of the wheel carrier however can only be accomplished with relatively great technical effort since two bearing points each have to be provided on the wheel carriers through which a rotary degree of freedom is provided.

A technically simpler solution is described in the German publication DE 10 2004 032 08 A1. There, the torsion-beam rear axle is not mounted to the vehicle substructure but to an additional axle support which supports itself on the substructure of the motor vehicle by means of an axle support bearing. By means of the additional movement pole defined by the axle support bearing, the lateral force behavior of the torsion-beam rear axle can be specifically influenced. Although a satisfactory solution of the problem can be achieved through this measure, it is necessary to provide an additional axle support for mounting the torsion-beam rear axle which, depending on the vehicle type, is not always desirable.

In view of the foregoing, at least one object consists of making available a torsion-beam rear axle of a vehicle that is easily accomplished, through which the lateral force over steer can be counteracted when driving through curves. In addition, other objects, desirable features and characteristics will become apparent from the subsequent summary, detailed description, and the appended claims, taken in conjunction with the accompanying drawings and this background.

SUMMARY

According to an embodiment of the invention, the at least one object, other objects, desirable features and characteristics is at least partially with a torsion-beam rear axle of a vehicle, more preferably motor vehicle, is shown which is provided with two rigid trailing arms substantially extending in vehicle longitudinal direction, each of which with its one (for example in forward driving direction, front) end is mounted in a manner capable of swiveling (more preferably about a swivel axis arranged across the vehicle longitudinal direction) on a vehicle body or an axle support attached to the vehicle body. On its other (for example in forward driving direction, rear) end the trailing arms are each provided with a wheel bearing for the rotatable mounting of a vehicle wheel about its wheel center axis. Furthermore, the two trailing arms are connected with each other through a bending-resistant but torsionally soft cross-tie substantially extending in vehicle transverse direction which acts as stabilizer.

The torsion-beam rear axle according to an embodiment is substantially characterized in that each wheel carrier is attached to the corresponding trailing arm by means of at least three elastic wheel carrier bearings which, for example, are embodied in form of elastic damping bushings. Thereby, viewed in normal forward driving direction of the vehicle, at least two of the elastic wheel carrier bearings are arranged behind the wheel center axis (about which the wheel is rotatable) of the corresponding wheel and at least one elastic wheel carrier bearing is arranged in front of the wheel center axis. The two wheel carrier bearings arranged behind the wheel center axis a swivel axis for the swiveling of the wheel carrier relative to the trailing arm is defined.

Through the elastically swivel able assembly of the two wheel carriers to the respective trailing arms and the respective predetermination of a swivel axis between wheel carrier and trailing arms through the wheel carrier bearings, a desired elasto-kinematic can be achieved upon the acting of forces on the wheels in an advantageous manner.

With an advantageous embodiment of the torsion-beam rear axle, the swivel axis about which the wheel carrier is capable of swiveling relative to the trailing arm is directed so that when viewed in forward driving direction it passes a road contact plane of the wheel behind a road contact line. If in this case a lateral force acts on the wheel at its wheel contact line the wheel, via the lever arm located behind the wheel contact line, is subjected to an under steer movement so that an over steer movement, which occurs when driving through curves, can be counteracted in an advantageous manner.

With an advantageous embodiment of the torsion-beam rear axle, the swivel axis, about which the wheel carrier is capable of being swiveled relative to the trailing arm, is so directed that, viewed in forward driving direction, it passes a contact plane of the wheel in front of a wheel contact line in order to realize a desired elasto-kinematic behavior in this manner.

In conventional torsion-beam rear axles, the wheel carriers are arranged in a manner capable of swiveling opposite the trailing arm and are capable of being actuated by means of an actuator. The swivel axis, about which the wheel carrier is capable of being swiveled relative to the trailing arm, is customarily directed so that it passes a contact plane of the wheel on the vehicle outer side (i.e. on the side facing away from the vehicle center) of a wheel center plane (radially dividing the wheel). With a further advantageous embodiment of the torsion-beam rear axle, the swivel axis, about which the wheel carrier is capable of being swiveled relative to the trailing arm is so directed that it passes a contact plane of the wheel on the vehicle outer side of a wheel center plane in order to realize a desirable elasto-kinematic behavior in this manner.

In the torsion-beam rear axle according to the an advantageous elasto-kinematic behavior of the torsion-beam rear axle can be achieved through the elasto-kinematic properties of the elastic wheel carrier bearings even with other penetration points through the contact plane of the wheel, through which an over steer movement when driving through curves can be counteracted. More preferably with a further advantageous embodiment of the torsion-beam rear axle, the swivel axis, about which the wheel carrier is capable of being swiveled relative to the trailing arm is directed so that it passes a contact plane of the wheel on the vehicle center side of a wheel center plane in order to realize a desirable elasto-kinematic behavior in this manner.

Generally, a desirable elasto-kinematic behavior upon the action of forces on the wheel or the wheel carriers can be achieved through the arrangement and configuration of the elastic wheel carrier bearings of the torsion-beam rear axle according to an embodiment.

With an advantageous embodiment of the torsion-beam rear axle, the at least two elastic wheel carrier bearings arranged behind the wheel center axis are designed in form of elastic (for example cylindrical) damping bushings, wherein the damping bushings with their bushing axes are each arranged approximately in vehicle longitudinal direction. Through this, forces acting on the torsion-beam rear axle in vehicle longitudinal direction can be particularly effectively absorbed by the elastic damping bushings as a result of which the driving comfort and the handling of the vehicle are considerably improved. In contrast with this, a "softer" configuration of the respective front articulation of the trailing arms would be required for this purpose with a conventional torsion-beam rear axle, but which is always accompanied by an increase in the over steer tendency.

More preferably, in the above case it can furthermore be an advantage if the at least one elastic wheel carrier bearing arranged in front of the wheel center axis is designed in form of an elastic damping bushing, which with its bushing axis is arranged parallel or obliquely to the vehicle transverse direction in order to be able to particularly effectively absorb lateral forces acting on the wheel and the wheel carrier.

With a further advantageous embodiment of the torsion-beam rear axle, at least one spring means is arranged for each wheel carrier which so acts on the wheel carrier that via its stiffness a desired deflection of the wheel carrier relative to the trailing arm is brought about in order to set a desired toe-in angle in this manner.

With a further advantageous embodiment of the torsion-beam rear axle, an electric and/or hydraulic and/or pneumatic actuator is arranged for each wheel carrier for the swiveling of the wheel carrier about its swivel axis relative to the trailing arm. This, for example, can be a hydraulic servo cylinder. To control the actuator, a control and regulating device is provided. An actuator, acting on the wheel carrier, through which the wheel carrier can be swiveled relative to the trailing arm, is particularly advantageously attached to the trailing arm. Insofar an integrated arrangement of the actuator in the torsion-beam rear axle can be achieved in an advantageous manner.

If an actuator is provided for swiveling the wheel carrier relative to the trailing arm, the torsion-beam rear axle is advantageously designed so that the swivel axis about which the wheel carrier is capable of being elastically swiveled relative to the trailing arm is directed so that in the near surroundings of the contact line of the wheel it passes through the contact plane of the wheel or alternatively crosses the contact line so that a force effect on the wheel carrier and consequently on the actuator acting on the latter is minimized or avoided through the lateral forces which occur when the vehicle is driving through a curve and which act on the wheel.

An embodiment further extends to a vehicle, more preferably motor vehicle, with a torsion-beam rear axle as described above.

BRIEF DESCRIPTION OF THE DRAWINGS

The present invention will hereinafter be described in conjunction with the following drawing FIGURE, wherein FIG. 1 in a schematic perspective representation the basic construction of an exemplary embodiment of the torsion-beam rear axle according to the invention.

DETAILED DESCRIPTION

Figure 1:
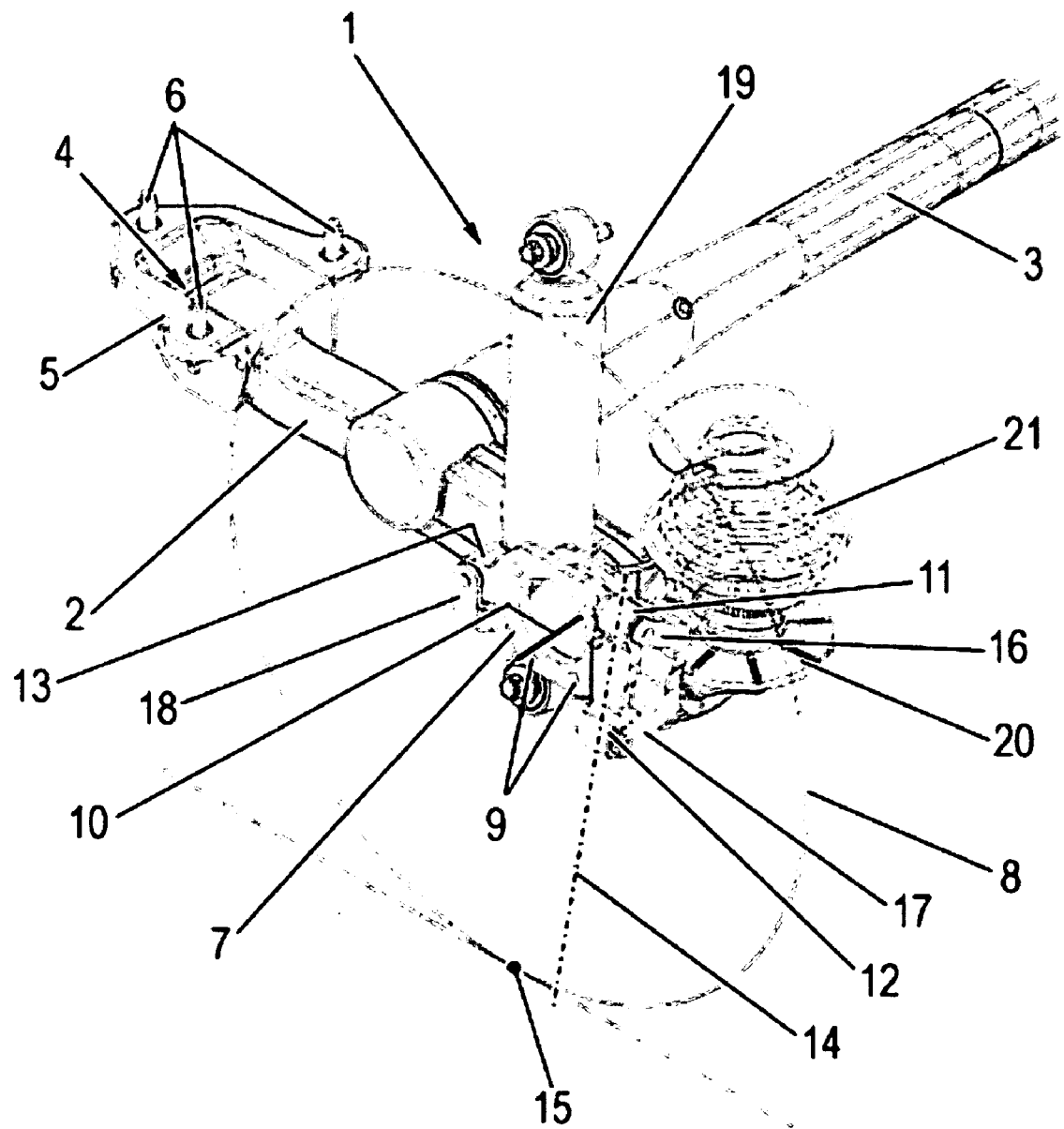

[The following detailed description is merely exemplary in nature and is not intended to limit application and uses. Furthermore, there is no intention to be bound by any theory presented in the preceding Summary and Background or the following detailed description.

FIG. 1 shows an exemplary embodiment of the torsion-beam rear axle of a motor vehicle altogether designated with the reference number 1. For the purpose of easier representation, merely an axle section of the torsion-beam rear axle 1 carrying the left rear wheel is shown in FIG. 1. The torsion-beam rear axle is provided in a suitable manner with an axle section carrying the right rear wheel that is designed symmetrically with the axle section carrying the left rear wheel.

Accordingly, the torsion-beam rear axle 1 comprises two rigid trailing arms 2 substantially extending in vehicle longitudinal direction which, via a flexurally stiff, but torsionally soft cross-tie 3, substantially extending in vehicle transverse direction, are connected with each other. The cross-tie 3, which for example is connected with the trailing arms 2 through welding, acts as a stabilizer during the counter-equal compression and bumping of the two wheels carried by the torsion-beam rear axle 1.

Each trailing arm 2 at its front sided end is mounted via an elastic trailing arm damping bushing 4 to the vehicle body or to an axle support fastened to the vehicle body. The trailing arm damping bushing 4 is inserted in a bearing eye formed by the front sided end of the trailing arm 2 which is not shown in more detail in FIG. 1.

The trailing arm damping bushing 4 comprises a substantially cylindrical outer bushing jacket which is enclosed by the bearing eye and an inner thrust element 5 arranged coaxially thereto, between which a damping body for example consisting of rubber is arranged. For fastening the trailing arm 2 to the body or axle support the bushing jacket for example is securely connected with the bearing eye through pressing-in for example and the thrust element is securely screwed to the body or the axle support via screw bolts 6. The trailing arm damping bushing 4 with its axis direction (cylinder axis of the bushing jacket) is oriented transversely to the vehicle longitudinal direction so that the trailing arm 2 is capable of being elastically swiveled about a swivel axis which is oriented transversely to the vehicle longitudinal direction. To the same extent it would also be possible to arrange the trailing arm damping bushing 4 with its axis direction (cylinder axis of the bushing jacket) obliquely to the vehicle longitudinal direction.

Each trailing arm 2 at its rear sided end is provided with a wheel carrier 7 on which a wheel 8 is rotatably mounted about a wheel center axis 10 in screw bores 9 with fastening screws which are not shown in any detail. Each wheel carrier 7 is connected with the corresponding trailing arm 2 via three elastic bearing bushings, which are designed here for example in form of cylindrical wheel carrier damping bushings.

Each wheel carrier damping bushing 11, 12, 13 comprises an outer cylindrical bushing jacket and an inner cylindrical thrust element coaxially thereto, between which a damping body for example consisting of rubber is arranged. A first wheel carrier damping bushing 11 and a second wheel carrier damping bushing 12 are arranged, viewed in normal forward driving direction of the vehicle, behind the wheel center axis 10 of the wheel 8 while a third wheel carrier damping bushing 13 is arranged in front of the wheel center axis 10 of the wheel 8.

The two wheel carrier damping bushings 11, 12 arranged behind the wheel center axis 10, which with a selectable distance are approximately arranged vertically above/below each other, are approximately arranged with their axis directions parallel to the vehicle longitudinal direction and through their elasticity and arrangement jointly define a swivel axis 14 about which the wheel carrier 7 is capable of being swiveled relative to the trailing arm 2. As is evident in FIG. 1, the swivel axis 14 is directed so that viewed in normal forward driving direction of the vehicle, it passes a contact plane of the wheel 8 behind a wheel contact point 15 which is part of a wheel contact line extending transversely to the vehicle longitudinal direction. However it would likewise be also possible that the two wheel carrier damping bushings 11, 12 are arranged behind the wheel center axis 10 with their axis directions are arranged obliquely to the vehicle longitudinal direction.

The third wheel carrier damping bushing 13 arranged in front of the wheel center axis 10 with its axis direction is arranged approximately transversely to the vehicle longitudinal direction in order to particularly effectively convert lateral forces occurring when driving through curves into the desired elasto-kinematic characteristics. However, it would be equally possible that the third wheel carrier damping bushing 13 arranged in front of the wheel center axis 10 with its axis directions is arranged obliquely to the vehicle transverse direction. With appropriate elastic characteristics, the third wheel carrier damping bushing 13 can also be approximately arranged in vehicle longitudinal direction.

The two wheel carrier damping bushings 11, 12 arranged behind the wheel center axis 10 are rigidly connected with the trailing arm 2 via respective bearing yokes 16, 17, which are molded on to the trailing arm 2. Namely a first bearing yoke 16 for the first wheel carrier damping bushing 11 and a second bearing yoke 17 for the second wheel carrier damping bushing 12. Likewise, the third wheel carrier damping bushing 13 arranged in front of the wheel center axis 10 is rigidly connected with the trailing arm 2 via a third bearing yoke 18 molded on the trailing arm 2. Here, the outer bushing jacket of the damping bushings is rigidly connected with the wheel carrier in each case, for example, through pressing-in and each of the bearing yokes act on the wheel carrier damping bushings on the inner thrust element. It would likewise also be possible that the bearing yokes each rigidly connected with the outer bushing jacket while the wheel carrier acts on the inner thrust bodies of the wheel bearing damping bushings. FIG. 1 merely shows an exemplary bearing for the wheel carrier damping bushings. Any other suitable bearing can be used for the wheel carrier damping bushings.

The torsion-beam rear axle 1 furthermore comprises a shock absorber 19 which sits on the trailing arm 2 and an axle spring 21 which supports itself on a spring cup 23 of the trailing arm 2.

Through the torsion-beam rear axle 1 shown in FIG. 1, an over steer movement, which occurs when driving through curves, can be counteracted in an advantageous manner since a lateral force acting on the wheel contact point 15 towards the vehicle center on the wheel 8 when driving through curves swivels the wheel 8 and the wheel carrier 7 in the sense of an under steer movement about the swivel axis 14. Absorption of the lateral force can more preferably be achieved through a suitable arrangement of the third wheel carrier damping bushing 13. In addition an increased longitudinal yield is advantageously achieved through the wheel carrier damping bushings 11-13, which in connection with the trailing arm damping bushing 4, results in a considerable comfort improvement.

Not shown in FIG. 1 is an actuator which is merely to be provided as an option, through which the wheel carrier 7 can be swiveled about the swivel axis 14 relative to the trailing arm 2. Instead of the actuator, a spring means could be arranged which acts on the wheel carrier so that via its stiffness a desired swiveling of the wheel carrier can be brought about and as a result a desired toe-in angle is set.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A torsion-beam rear axle of a vehicle having a vehicle body, a longitudinal axis, a transverse axis, a first wheel carrier, a second wheel carrier, a first wheel and a second wheel, comprising:

a first rigid trailing arm having a first end and a second end, the first end mounted so as to be capable of swiveling on the vehicle body and the second end attached to the first wheel carrier for the rotatable mounting of the first wheel about a first center axis of the first wheel;

a second rigid trailing arm having a third end and a fourth end, the third end mounted so as to be capable of swiveling on the vehicle body and the fourth end attached to the second wheel carrier for the rotatable mounting of the second about a second center axis of the second wheel;

a torsionally soft cross-tie connecting the first rigid trailing arm and the second rigid trailing arm; and at least three elastic wheel carrier bearings at least coupling one of the first wheel carrier to the first rigid trailing arm and the second wheel carrier to the second rigid trailing arm, wherein at least two bearings of the at least three elastic wheel carrier bearings are located behind at least one of the first center axis and the second center axis and at least one bearing of the at least three elastic wheel carrier bearings is located in front at least one of the first center axis and the second center axis in such a manner that through the at least two bearings, a swivel axis is defined for swiveling of at least one of the first wheel carrier relative to the first rigid trailing arm and the second wheel carrier relative to the second rigid trailing arm;

wherein the at least two elastic wheel bearings comprises a first elastic damping bushing and a second elastic damping bushing, and wherein the at least one elastic wheel bearing comprises a third elastic damping bushing;

wherein the first elastic damping bushing and the second elastic damping bushing each have an axis oriented substantially parallel to the longitudinal axis of the vehicle;

wherein the third elastic damping bushing has an axis oriented substantially parallel to the transverse axis of the vehicle; and wherein the first elastic damping bushing and the second elastic damping bushing are arranged along an axis that is substantially orthogonal to both the transverse axis and the longitudinal axis of the vehicle.

2. The torsion-beam rear axle according to claim 1, wherein the swivel axis is capable of swiveling relative to at least one of the first rigid trailing arm and the second rigid trailing arm and directed to pass through a contact plane of at least one of the first wheel and the second wheel behind a wheel contact line.

3. The torsion-beam rear axle according to claim 1, wherein the first, second, and third elastic damping bushings are elongated cylindrical bushings having substantially the same size.

* * * * *